Jan. 14, 1969   W. M. RIGGLES, JR   3,422,446
COMBINED FINGERPRINT VIEWING AND PHOTOGRAPHIC APPARATUS
Filed July 19, 1965   Sheet 1 of 3

INVENTOR
WILLIAM M. RIGGLES, JR.
BY
Salvatore G. Militana
attorney

INVENTOR
WILLIAM M. RIGGLES JR.

Jan. 14, 1969   W. M. RIGGLES, JR   3,422,446
COMBINED FINGERPRINT VIEWING AND PHOTOGRAPHIC APPARATUS
Filed July 19, 1965   Sheet 3 of 3

INVENTOR
WILLIAM M. RIGGLES JR.
BY Salvatore G. Militana
attorney

United States Patent Office 3,422,446
Patented Jan. 14, 1969

3,422,446
COMBINED FINGERPRINT VIEWING AND
PHOTOGRAPHIC APPARATUS
William M. Riggles, Jr., Hialeah, Fla., assignor of thirty percent to Salvatore G. Militana, Miami Shores, Fla.
Filed July 19, 1965, Ser. No. 472,993
U.S. Cl. 95—1.1    8 Claims
Int. Cl. G03b 17/24; G03b 27/32; G03b 27/52

ABSTRACT OF THE DISCLOSURE

A combined fingerprint viewing and photographic apparatus having a 5-sided prism whose rear side is enclosed to form a chamber void of light whereby a darkened surface is presented to the main wall of the prism. A light source directs light rays through a side wall of the prism to reflect from the main wall. A camera is directed toward the front wall of the prism for photographing a fingerprint appearing on the main wall when a finger is placed on the main wall.

---

This invention relates to fingerprinting devices and is more particularly directed to a combined fingerprint viewing and photographic apparatus.

The present method universally used of inking one's fingertips and rolling the fingers on a sheet of white paper results in a perfect print of black ridges and white valleys.

Attempts to produce this same result to date by placing one's finger on a prism or similar transparent body and viewing or photographing the print formed on the prism have been disappointing if not unsuccessful. The primary fault in these devices resides in the lack of ability to provide a sufficient light contrast between the ridges and valleys that constitute the fingerprint to effect a distinguishable print for viewing or photographic purposes.

The present invention contemplates providing a proper light contrast necessary for effecting a distinguishable fingerprint by enshrouding completely a rear face of a prism to create a darkened chamber. A source of light is then positioned along side the prism whereby light rays will reflect off the top face of the prism which is itself darkened by the reflection occasioned by the darkened chamber. Now when the darkened surface of the top face of the prism is interrupted as occurs when a finger is placed thereon, the valleys of the fingerprint will be dark while the ridges which engage the surface of the rism will be lighted thereby producing the necessary contrast to permit viewing or photographing the fingerprint.

Therefore, a principal object of the present invention is to provide a fingerprint viewing and photographic apparatus which creates a sufficient light contrast between the ridges and valleys of a fingerprint to form a distinguishable fingerprint and permit the ready viewing and photographing of the fingerprint.

Another object of the present invention is to provide a fingerprint viewing and photographic apparatus which permits the viewing of the fingerprint prior to photographing same in order to prevent persons from camouflaging their fingerprint and defeat the effectiveness of the apparatus.

A further object of the present invention is to provide a fingerprint viewing and photographic apparatus which takes the photograph simultaneously of a person's fingerprint, his face and a document such as a check and the like.

A still further object of the present invention is to provide a fingerprint viewing and photographic apparatus that is simple in construction and operation and most effective to readily view and photograph a fingerprint.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 3:
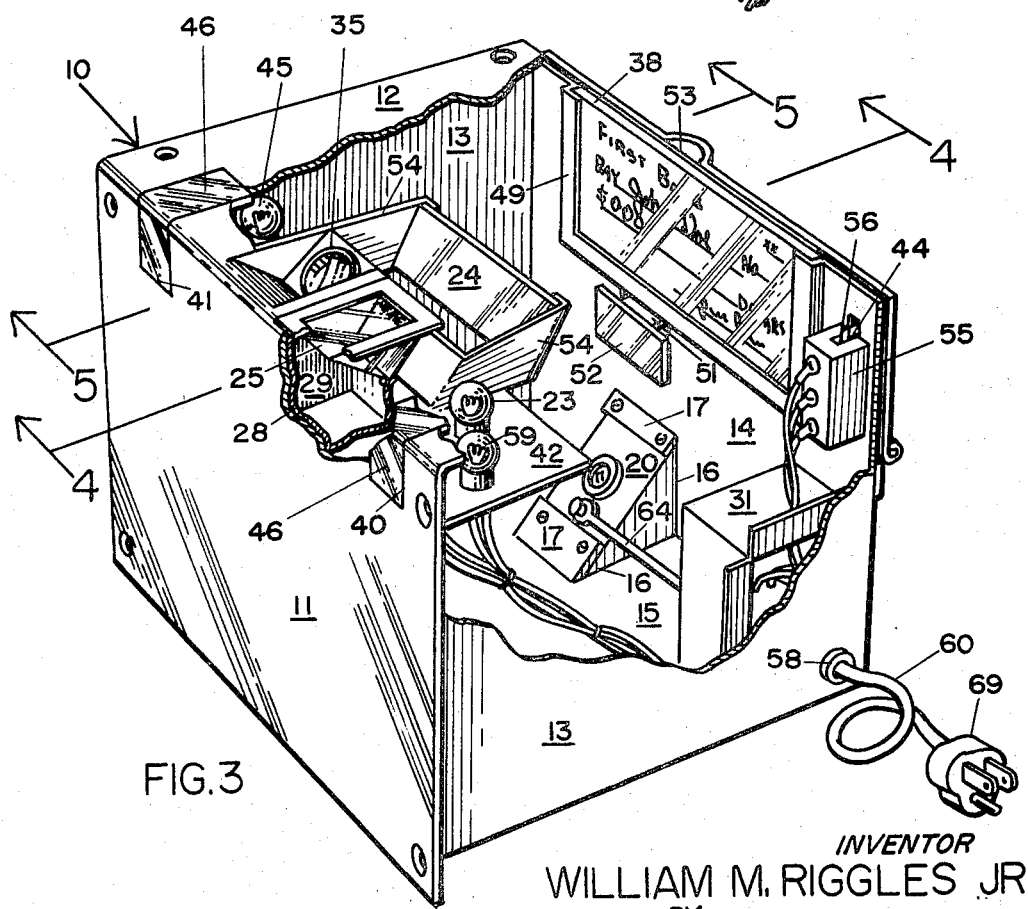
FIGURE 3 is a detailed perspective view with parts broken away.
Figure 4:
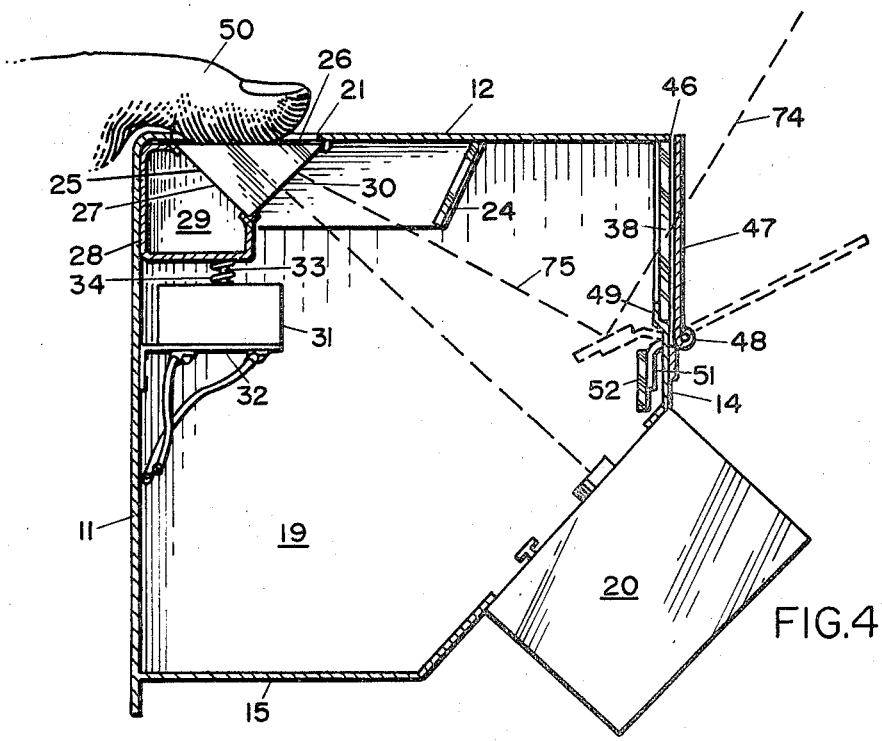
Figures 5, 8:
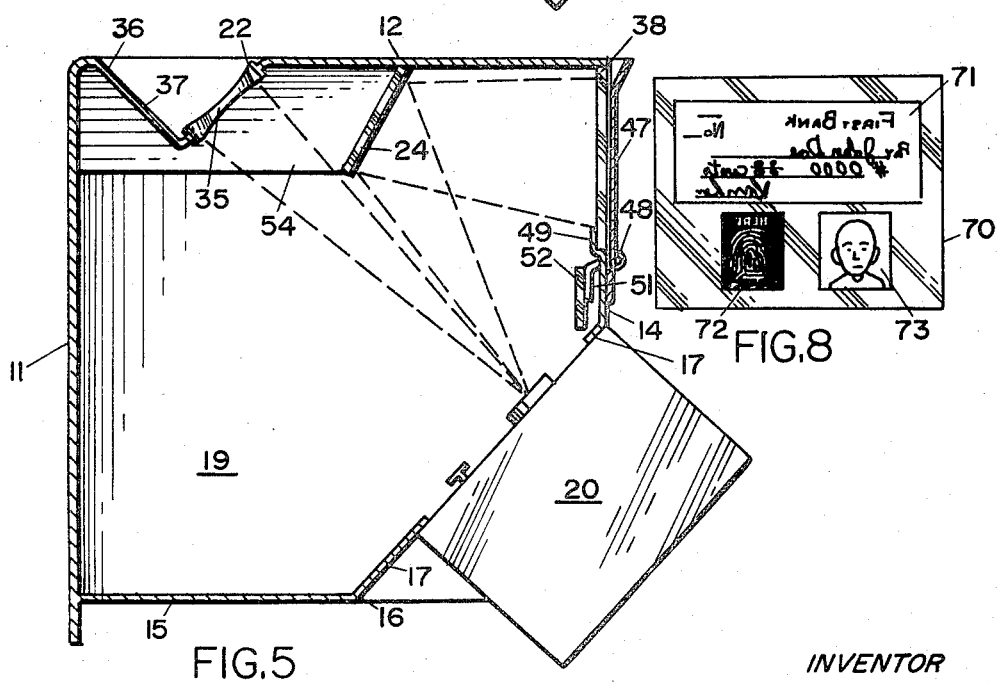

FIGURES 4 and 5 are cross sectional views taken along the lines 4—4 and 5—5 respectively in FIGURE 3.

Figure 2:
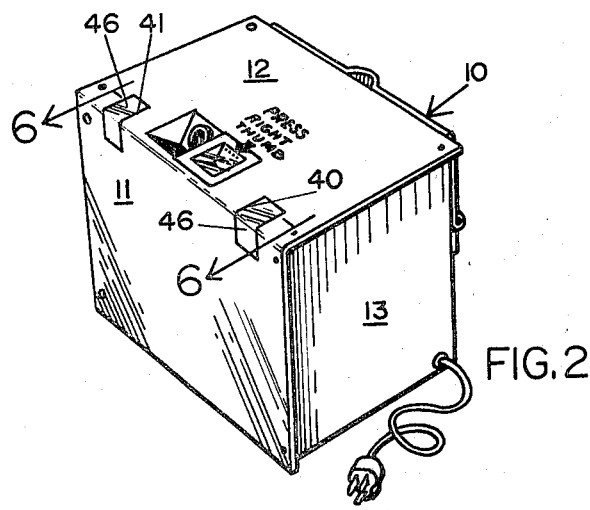
FIGURE 2 is an enlarged perspective view of my fingerprint viewing and photographic apparatus as seen removed from the cabinet.
Figure 6:
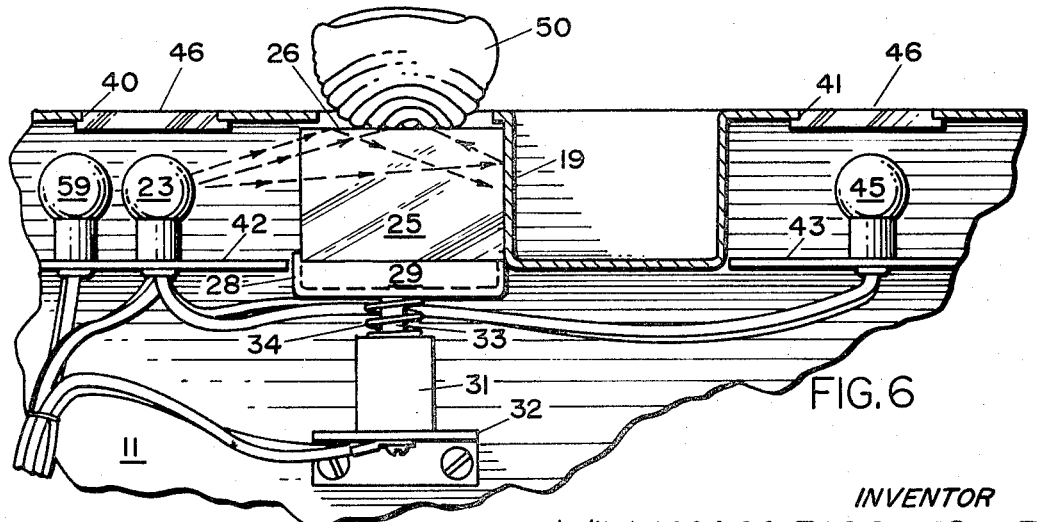

FIGURE 6 is a fragmentary cross sectional view taken along the line 6—6 of FIGURE 2.

Figure 7:
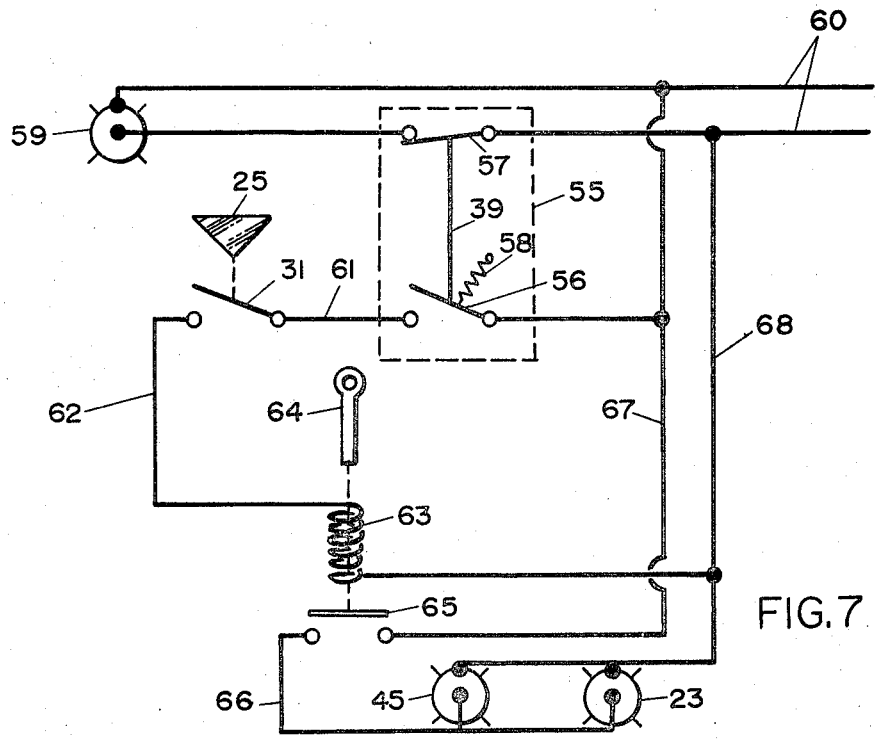

FIGURE 7 is a schematic wiring diagram of my apparatus.

FIGURE 8 illustrates a photograph taken by each operation of the camera of my apparatus.

Figure 1:
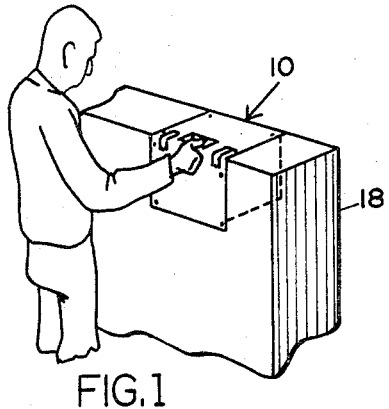
FIGURE 1 is a perspective view of a fingerprint viewing and photographic apparatus embodying my invention and shown mounted on a cabinet and with a person in front of the apparatus in the act of operating my device.

Referring to the drawings wherein like numerals are used to designate similar parts throughout the several views the numeral 10 refers to my fingerprint viewing and photographic apparatus consisting of a housing having a front wall 11, top wall 12, side walls 13, a rear wall 14 and a bottom wall 15. Both the rear and bottom walls 14 and 15 have openings 16 with flanges 17 for supporting a camera 20. The housing 10 is an enclosed rectangular box-like member including a chamber 19 in which the working parts are contained. The front and top walls 11 and 12 are flanged at their edges to support the housing 10 when positioned and secured in an opening in a cabinet or counter 18 which maaintains the apparatus securely and at a suitable level for the proper operation of the apparatus as shown by FIGURE 1.

My apparatus 10 provides for viewing and photographing a person's thumb or fingerprint, photographing his face and a document such as a check on a single exposure and on a film as best illustrated by FIGURE 8. Since the fingerprint may be viewed by the operator of my apparatus 19 as is explained in detail hereinafter, prior to photographing the fingerprint, it can be ascertained whether or not the finger has been tampered with to prevent the fingerprint from being properly photographed. To this end, the camera 20 is secured to the flanges 17 at the position of the openings 16 with the camera 20 faced toward the front wall 11 and its focus directed at openings 21 and 22 formed in the upper wall 12 and at a mirror 24 mounted on the upper wall 12 as shown by FIGURES 4 and 5.

Within the opening 21 there is positioned a 90°–45°–45° ground and polished prism 25 with its largest face or hypotenuse 26 horizontally disposed and bearing upwardly against the edges of the top wall 12. One of the smaller faces 27 which extends in the direction of the front wall 11 is completely enshrouded by a casing 28 to form an enclosed chamber 29. The inner surface of the casing 28 is painted black to form a black cavity or darkened chamber 29 whose darkness is reflected as a black background on the large polished face 26 of the prism 25. When viewed through the other smaller face 30 of the prism 25, the large face 26 is seen as a black or darkened surface. On one side of the prism 25 there is a light bulb 23 whose light enters through the side walls of the prism 25 with the rays being reflected off the large blackened surface 26. There is a polished wall surface 19 that is positioned at the other side of the prism 25 opposite that of the light bulb 23. This arrangement of the prism 25, black cavity 29, light bulb 23 and polished surface 19 causes the light rays to bound towards and rebound from the large surface 26 of the prism 25. Viewing the large face 26 of the prism 25 through the face 30, one will see the large face 6 as a darkened or black area with the remainder of the prism 25 being luminous. When a thumb or finger 50 is placed on the prism 25 and engaging the large face 26, the complete portion of the thumb or finger 50 which contacts the prism 25 will be seen. It appears that the darkened chamber 29 provides the large face 26 with a black background which acts to reflect light in the same manner as the silver coating on the rear surface of a mirror. Now, when an object such as a thumb 50 is pressed against the large face 26, that portion, namely the ridges of the thumb 50 contact the glass surface 26 and interrupt the light rays emanating from the light bulb 23 to prevent those rays from reflecting off the face 26 as before and now permit the ridge to be seen as a white or light image. That portion of the fingerprint between the ridges will not engage or contact the surface of the face 26 and will appear as a darkened line or surface.

Another way of explaining the above phenomenon is to state that the black background on the surface 26 created by the darkened chamber 29 is interrupted by the papillary lines or ridges of the finger 50 and will appear as light lines with the valleys between the ridges appearing as black lines and the remainder of the surface 26 continuing to appear as a black background. Without the contrast of the light papillary lines or ridges of the fingerprint and the darkened valleys between the ridges, the fingerprint could not be viewed so as to read or identify the fingerprint.

Because the camera 20 is focused on the darkened surface 26 of the prism 25, a time exposure can be taken which will permit the finger to be rolled along the surface of the prism 25 in much the same manner as in the conventional way of obtaining fingerprints with the use of ink. By using timed exposure, the camera 20 will photograph a print effected by rolling the finger since the film will be exposed to light only when the black background reflected by the larger face 26 is interrupted as the ridges of the finger contact the surface 26 of the prism 25 in the rolling action of the finger.

Below the casing 28 is a switch device 31 mounted on a shelf 32 that is secured to the front wall 11. Extending upwardly of the switch device 31 is a switch pin 33 supporting the casing 28 and prism 25 with a coil spring 34 yieldingly forcing the prism 25 in an upward direction against the top wall 12. When pressure is applied on the prism 25 as occurs when a person places his thumb or finger 50 thereon with a slight downward force, the prism 25 will move downwardly causing the switch 31 to be actuated to close a circuit as will be explained hereinafter, and actuate the camera 20. Upon removal of the finger from the prism 25, the coil spring 34 will force the prism 25 to its upward position and the circuit previously closed will now be open and the film of the camera 20 advanced in preparation for exposing another film.

As well as being focused on the smaller face 30 of the prism 25 the camera 20 is focused on a double concave magnifying lens 35 mounted adjacent to and in close proximity to the prism 25. The lens 35 is mounted in an opening 36 formed in the top wall 12 by stamping and bending a portion 37 of the top wall 12 downwardly and forming a support for the lens 35. The face of the person standing before the apparatus 10 as he places his finger on the prism 25 will be reflected by the lens 35 and viewed by the camera 20 to become imprinted on the film when the camera 20 is actuated as shown in a film 70 by FIGURE 8.

In order to eliminate shadows on the person's face, the apparatus 10 provides light to be projected toward the person's face. At the upper front corners of the housing there is a pair of openings 40 and 41 extending from the top wall 12 to the front wall 11, the opening 40 being adjacent to the prism 25 while the opening 41 is adjacent the lens 35. Brackets 42 and 43 which are mounted within the chamber 14 on the front wall 11 support light bulbs 23 and 45 respectively in alignment with the openings 40 and 41 so that when these light bulbs are energized light will emanate therefrom passing through transluscent plastic members 46 which cover the openings 40 and 41. The light bulb 23 as previously explained, also functions to direct rays of light into the prism 25 through the side wall thereof.

The rear wall 14 of the housing is provided with an opening 46 enclosed by a door 47 that is hinged as at 48 along its lower horizontal side. The hinge 48 is spring tensioned to return the door 47 to its closed position when released. The inside edge portion of the door 47 is provided with a peripheral flange 49 along three sides for receiving a glass plate 38. The glass plate 38 is slightly spaced from the inside surface of the door 47 to permit placing a document such as a check 53 and the like that is to be photographed in position against the surface of the door 47 and be viewed through the glass plate 38. At the lower portion of the door 47 threre extends downwardly within the chamber 13 an arm 51 having a mirror 52 attached thereon. The mirror 52 is so positioned that when the door 47 is swung to its open position, the operator of the device 10 can view along sight line 75 to see the finger or thumb print that is effectuated by the person who has placed his finger or thumb on the prism 25. The operator is able to ascertain what the picture of the finger or thumb print will be when later photographed by the camera 20. Also, the operator will prevent a person from causing the device 10 to fail to take a proper picture of the fingerprint. In the event a person superimposed a strip of clear tape on his finger or thumb, then upon placing the finger on the prism 25, the smooth surface of the tape will be photographed as a light area with vague or no distinguishable papillary lines that constitute the fingerprint. By being able to view the fingerprint through use of the mirror 52 prior to taking a photograph of the fingerprint, the operator is able to prevent a person from camouflaging his fingerprint.

In order for the camera to be capable of taking the picture of the check or document 53 that has been placed between the window 38 and the door 47, the mirror 24 is positioned in the chamber 19 in proximity of the top wall 12 as shown by FIGURES 3–5. The mirror 24 is held in position by bracket members 54 that are secured to the top wall 12 engage the ends of the mirror 24 at each side edge. The bracket members 54 extend forwardly to the edge of the prism 25 on one side and the magnifying lens 35 on the other side to prevent any stray light from entering the prism 25 and lens 35 which light would impair the light and dark contrast that is necessary in order to produce a clear picture of the fingerprint. The mirror 24 reflects the image of the check 70 into the camera 20 as indicated by FIGURE 5.

Mounted in the chamber 11 on the rear wall 14 is an interlock switch box 55 provided with a switch 56 which is actuated by an interlock or arm 44 secured to the door 47. The switch 56 is connected to a test lamp switch 57 by a connector 39 in such a manner that when the main switch 56 is brought to its open position upon opening the door 47, the connector 39 closes the test lamp 57 and when the door 47 is shut, the main switch 56 will be brought to its closed position as the test lamp switch is opened. The test lamp switch 57 as shown by FIGURE 7 is connected in series with a test lamp 59 mounted on the bracket 42 by wires 60 that extend to a source of electricity (not shown). The interlock main switch 56 is connected by a wire 61 in series with the prism switch 31 and by a wire 62 to a spring loaded solenoid 63 that operates a switch 65. The solenoid 63 is connected by an arm 64 to the camera 20. Actuation of the solenoid arm 64 which extends from a junction box 31 will operate the shutter of the camera 20 to take the picture and simultaneously close the light switch 65 that is connected by wire 66 to light bulbs 23 and 45. Wires 67 and 68 are connected to the wires 60 at one end and to the light switch and the light bulbs 23 and 45 respectively at the other end. The wires 60 extend through an opening 58 in the housing and are connected to a male plug 69.

In the normal operation of my fingerprint viewing and photographic apparatus, the operator opens the door 47 of the cabinet 10 and places the check or other document to be photographed in the pocket formed by the flanges 49 on the inside surface of the door 47 and held in position by the window 38. Upon the door 47 being opened, the interlock switch arm 44 releases the main switch 56 which under the influence of the spring 58 is opened while the connector arm 39 causes the test lamp switch 57 to be closed to energize the test lamp 59. The operator then directs the person to place his right thumb or designated finger on the prism 25 and told to press downwardly thereon. With the door 47 opened to the dotted line position as shown by FIGURE 4, the operator is able to look into the mirror 52 and see the thumb print as it will be photographed by the camera 20.

Then the operator closes the door 47, compelling the arm 44 to actuate and close the main switch 56 and simultaneously open the test lamp switch 57 deenergizing the test light 59. Since the prism switch 31 was closed when the person placed his thumb on the prism 25 and forced downwardly sufficiently thereon, the solenoid switch 63 will be actuated, causing the camera to be tripped and the film exposed simultaneously with the lights 23 and 45 being energized whereby the picture of the thumb print, of the person's face and of the check 70 will be taken on one exposure. Upon breaking the circuit by opening the door 47, the spring loaded solenoid switch 65 will return to its open position, deenergizing the lights 23 and 45 and simultaneously advancing the film for the next exposure. The film 70 if of the Polaroid type will indicate immediately a negative image with the check image 71 across the upper portion of the film 70, the finger print image 72 below on one side and the person's face 73 imprinted alongside thereof. If conventional film is used, upon developing the film, the positive image will be indicated on the developed film.

As pointed out hereinabove, in view of the fact that the surface 26 of the prism 25 upon which the finger is impressed is provided with a darkened background, a timed exposure may be used permitting the taking of a fingerprint effectuated upon rolling the finger thereby rendering a more complete print of a person's finger than the usual print formed by merely pressing the finger.

From the foregoing it will be apparent that I have provided an apparatus for viewing and photographing a finger and simultaneously photographing a person's face as well as a check or any other document to be identified with the person offering same. This apparatus will operate as a deterrent in the passing of bad or worthless checks and the sale of stolen goods to pawn shops since the person involved can be positively identified by his thumb or fingerprint.

By the use of a Polaroid type film this apparatus may be used to record a baby's hand and footprint immediately upon birth of the baby thereby giving rise to many advantages over the present conventional ink-impression method. Since my invention is capable of photographing a fingerprint made by rolling the finger, the law enforcement agencies will find use for my apparatus that will be superior in results to those of the method now used. Also, a skilled and highly trained person is required to make a good fingerprint for law enforcement or positive identification purposes while my apparatus will make photographs of perfect fingerprints without the need of expert personnel.

Having disclosed my invention, what I claim as new and desire to secure by Letters Patent of the United States is:

1. A fingerprinting photographic apparatus comprising a transparent body having a main wall, a pair of obliquely disposed walls joined along one end and extending to edges of said main wall, side walls engaging said main and pair of obliquely disposed walls, means enshrouding said one of said pair of obliquely disposed walls forming a chamber substantially void of light whereby a darkened surface is presented to said top wall, a light source positioned adjacent to at least one of said side walls for directing rays of light through said transparent body and a camera focused on said transparent body whereby upon placing a finger on said main wall, said darkened surface is interrupted at the position of the ridges of said fingerprint and said rays of light illuminate said ridges to permit said camera to photograph said fingerprint.

2. A fingerprinting photographic apparatus comprising a transparent body having a main wall, an obliquely disposed front wall, a rear wall and side walls, means preventing light rays from entering through said rear wall and forming a space adjacent said rear wall substantially void of light whereby said main wall presents a darkened surface, light source means positioned in proximity of said transparent body directing rays of light through said transparent body, and a camera focused on said transparent body whereby upon placing a finger on said main wall said darkened surface is interrupted at the position of the ridges of said finger print and said rays of light illuminate said ridges to permit said camera to photograph said fingerprint.

3. A fingerprint viewing apparatus comprising a transparent body having a main wall, an obliquely disposed front wall, a rear wall and side walls, means enshrouding said rear wall forming a chamber substantially void of light whereby a darkened surface is presented to said main wall, a light source positioned adjacent to one of said side walls for directing rays of light through said transparent body whereby upon placing a finger on said main wall, said darkened surface of said main wall is interrupted at the position of the ridges said finger and said rays of light illuminate said ridges to permit viewing said fingerprint.

4. A fingerprint viewing apparatus comprising a transparent body having a main wall, an obliquely disposed front wall, a rear wall and side walls, means preventing light rays from entering through said rear wall and forming a space adjacent said rear wall substantially void of light whereby said main wall presents a darkened surface, light source means positioned in proximity of said transparent body directing rays of light through said transparent body, whereby upon placing a finger on said main wall, said darkened surface of said main wall is interrupted at the position of the ridges of said finger and said rays of light illuminate said ridges to permit viewing said fingerprint.

5. A fingerprint viewing and photographic apparatus comprising a housing having a plurality of openings in a top portion, a prism having a top face, a front face, a rear face and side faces positioned in one of said openings, switch means supporting said prism whereby placing a finger and applying a downward force on said prism actuates said switch means, a wall enshrouding said rear face of said prism to form a darkened chamber presenting a darkened background on said top face, a light source positioned in said housing adjacent to said prism and transmitting light rays into said prism to illuminate the ridges of said finger at the positions said ridges interrupt said darkened background of said top face, a camera mounted on said housing and focused on said top face of said prism through said front face, solenoid means connected to said camera for actuating said camera, circuit means connecting said switch means, said light source and said solenoid means, whereby upon the depressing of said prism said switch means closes said circuit means, said light source is energized and said camera is actuated to take a picture of the fingerprint on said prism.

6. A fingerprint viewing apparatus comprising a housing having an opening in a top portion and in a rear portion, a prism having a top face, a front face, a rear face and side faces positioned in said opening in the top portion of said housing, switch means supporting said prism whereby placing a finger and applying a downward force on said prism actuates said switch means, a wall enshrouding said rear face of said prism to form a darkened chamber presenting a darkened background on said top face, a light source positioned in said housing adjacent to said prism and transmitting light rays into said prism to illuminate the ridges of said finger at the positions said ridges interrupt said darkened background of said top face, a mirror mounted in said housing adjacent said second named opening and facing said prism whereby upon placing a finger on said top face of said prism said fingerprint is reflected on said mirror through said last named opening.

7. A fingerprint viewing and photographic apparatus comprising a housing having a plurality of openings in a top portion, a prism having a top face, a front face, a rear face and side faces positioned in one of said openings, switch means supporting said prism whereby placing a finger and applying a downward force on said prism actuates said switch means, a wall enshrouding said rear face of said prism to form a darkened chamber presenting a darkened background on said top face, a light source positioned in said housing adjacent to said prism and transmitting light rays into said prism to illuminate the ridges of said finger at the positions said ridges interrupt said darkened background of said top face, a camera mounted on said housing and focused on said top face of said prism through said front face, an opening in a rear wall of said housing, a door enclosing said opening, a mirror mounted on said door facing toward said prism when said door is in an open position for viewing said finger placed on said prism, means mounted on the inner surface of said door for retaining a document to be photographed, a second mirror mounted in said housing, said second mirror being positioned to focus on said camera and reflect thereto an image of said document positioned in said door, solenoid means connected to said camera for actuating said camera, circuit means connecting said switch means, said light source and said solenoid means, and interlock means interengaged by said door and mounted in said circuit means whereby upon closing said door and depressing said prism, said light source is energized and said camera is actuated to take a picture of the fingerprint on said prism and said document on said door.

8. The structure as recited by claim 7 taken in combination with lens means mounted in the other of said openings for reflecting the face of a person being fingerprinted and said camera being focused on said lens means whereby the face of said person is photographed simultaneously with the photographing of said fingerprint and said document.

References Cited

UNITED STATES PATENTS

| 2,195,699 | 4/1940 | Johnson | 88—24 |
| 2,579,961 | 11/1951 | Pompa | 88—24 |
| 3,174,414 | 3/1965 | Myer | 88—24 X |

FOREIGN PATENTS 432,240  7/1926  Germany.

NORTON ANSHER, *Primary Examiner.*

W. A. SIVERTSON, *Assistant Examiner.*

U.S. Cl. X.R.

355—39, 42